US012170961B2

(12) United States Patent
Watts et al.

(10) Patent No.: US 12,170,961 B2
(45) Date of Patent: Dec. 17, 2024

(54) METHOD AND SYSTEM FOR PREDICTIVE DISCONTINUOUS RECEPTION BYPASS

(71) Applicant: Verizon Patent and Licensing Inc., Basking Ridge, NJ (US)

(72) Inventors: Mark T. Watts, Newport, RI (US); Donna L. Polehn, Mercer Island, WA (US); David Taft, Keller, TX (US); Corey J. Christopherson, Bainbridge Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 449 days.

(21) Appl. No.: 17/714,431

(22) Filed: Apr. 6, 2022

(65) Prior Publication Data

US 2023/0328650 A1 Oct. 12, 2023

(51) Int. Cl.
*H04W 52/02* (2009.01)
*H04W 72/1268* (2023.01)
*H04W 72/23* (2023.01)
*H04W 76/10* (2018.01)
*H04W 76/28* (2018.01)

(52) U.S. Cl.
CPC ... *H04W 52/0235* (2013.01); *H04W 72/1268* (2013.01); *H04W 72/23* (2023.01); *H04W 76/10* (2018.02); *H04W 76/28* (2018.02)

(58) Field of Classification Search
CPC ......... H04W 52/0235; H04W 72/1268; H04W 72/23; H04W 76/10; H04W 76/28; H04W 28/0268; H04W 40/005; H04W 72/20; H04W 76/11; Y02D 30/70
See application file for complete search history.

(56) References Cited

U.S. PATENT DOCUMENTS

2022/0256460 A1* 8/2022 Sjöland ............... H04L 27/2613

* cited by examiner

*Primary Examiner* — Ayanah S George (57) ABSTRACT

A method, a device, and a non-transitory computer-readable storage medium are described in which an predictive discontinuous reception (DRX) bypass service is provided. The bypass service may provide flow control signaling that enables an uplink grant to be transmitted to an end device regardless of the DRX mode. The bypass service may provide for an immediate grant for uplink data and may improve latency. The bypass service may also provide flow control signaling for downlink data that may cause the end device to wake up from a DRX mode and receive downlink data. The bypass service also provides predictive scheduling that allows an external network, such as a multi-access edge computing network to establish a DRX-free downlink connection before completion of data processing. The flow control signaling may include a quality of service flow identifier value that correlates to the bypass service.

20 Claims, 9 Drawing Sheets

METHOD AND SYSTEM FOR PREDICTIVE DISCONTINUOUS RECEPTION BYPASS

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

The following detailed description refers to the accompanying drawings. The same reference numbers in different drawings may identify the same or similar elements. Also, the following detailed description does not limit the invention.

A multi-access edge computing (MEC) network (also known as a mobile edge computing network) or other types of application and/or service layer networks, such as a cloud network, a public network (e.g., the Internet, the Web, etc.), a data center, a fog network, a packet data network (PDN), or the like (also referred to as an "application service layer network") may provide an application and/or a service (also referred to as an "application service"). The application service may include a monolithic application, a microservice, or another type of configurable architecture of an application service. The application service may be provisioned in a particular type of application service layer network that will support performance metrics (e.g., latency, reliability, error rate, etc.) and/or service requirements (e.g., quality of service (QoS) or the like) of the application service. Various type of end devices, such as user equipment (UEs), Internet of Thing (IoT) devices, mobile devices, stationary devices, and the like may access and use the application service.

A wireless end device may use discontinuous reception (DRX) to turn a radio receiver on and off according to a schedule that is coordinated between the wireless end device and a wireless network. In this way, the wireless device does not need to continuously monitor control channels for messages, and can reduce power consumption and extend battery life. That is, wireless end devices are not designed for continuous transceiver operation due to battery life, power use, and heat dissipation, for example.

The DRX mechanism can take, however, upwards of about 20 milliseconds or longer to cycle back on, for example. Thus, the DRX mechanism can hamper ultra-low latency and cause jitter problems associated with an application service. For example, currently there is no mapping and synchronization between a network, a network slice, and DRX mode of the wireless end device (e.g., connected mode DRX (C-DRX) versus idle mode DRX).

According to exemplary embodiments, a predictive discontinuous reception bypass service is described. According to an exemplary embodiment, the predictive discontinuous reception bypass service may suspend or bypass DRX for a network slice. For example, the predictive discontinuous reception bypass service may enable on-demand, non DRX (e.g., do not wait for DRX), over-the-air connectivity, as described herein.

According to an exemplary embodiment, an end device may invoke the predictive discontinuous reception bypass service for an uplink data flow. According to another exemplary embodiment, an application service layer network, such as a MEC network, may invoke the predictive discontinuous reception bypass service for a downlink data flow. According to an exemplary embodiment, the predictive discontinuous reception bypass service may include the generation and transmission of a message, which requests immediate grant (e.g., do not wait for DRX) for uplink (UL) or downlink (DL), to a radio access network (RAN) device.

According to the exemplary embodiment, the predictive discontinuous reception bypass service may include a predictive scheduler. The predictive scheduler may synchronize processing of data at the application service layer network with a setup of a DRX-free network slice in the downlink. For example, the predictive scheduler may perform the synchronization based on known and/or learned times associated with the setting up of the DRX-free network slice and the processing of the data.

According to an exemplary embodiment, for the downlink setup, the RAN device may transmit a control plane message that may cause the end device to turn on its transceiver even when the end device is in a DRX mode. According to an exemplary embodiment, the control plane message may be implemented as a Zadoff-Chu (ZC) sequenced signal, a Constant Amplitude Zero Autocorrection (CAZAC) sequence or another type of encoded signal (e.g., a modulation scheme and trellis or convolution code), as described herein. Thereafter, the end device may receive the downlink data via the DRX-free network slice.

In view of the foregoing, the predictive discontinuous reception bypass service may provide an intelligent DRX synchronization of an end device with the network and (RAN) network slicing for application services. As a consequence, the predictive discontinuous reception bypass service may enable sub-millisecond latency for an application service, for example. The predictive discontinuous reception bypass service allows for on-demand invocation of the service both at the end device side and the network side, which affords flexibility and different contexts.

Figure 1:
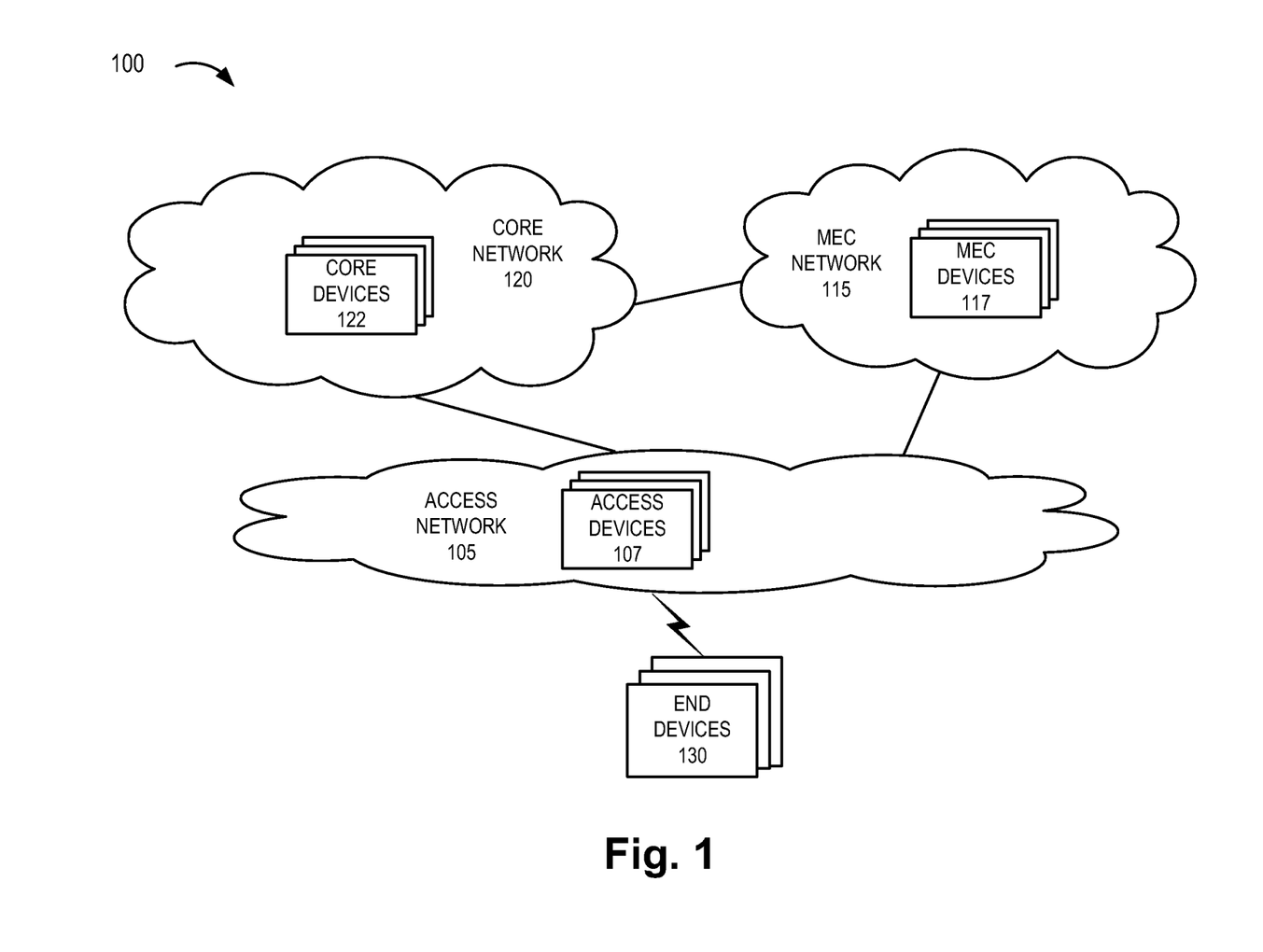
FIG. 1 is a diagram illustrating an exemplary environment in which an exemplary embodiment of a predictive discontinuous reception bypass service may be implemented.

FIG. 1 is a diagram illustrating an exemplary environment 100 in which an exemplary embodiment of predictive discontinuous reception bypass service may be implemented. As illustrated, environment 100 includes an access network 105, a MEC network 115, and a core network 120. Access network 105 includes access devices 107 (also referred to individually or generally as access device 107). MEC network 115 includes MEC devices 117 (also referred to individually or generally as MEC device 117). Core network 120 includes core devices 122 (also referred to individually or generally as core device 122). Environment 100 further includes end devices 130 (also referred to individually or generally as end device 130).

According to an exemplary embodiment of environment 100, at least some of access devices 107, core device 122, and MEC device 117 may be provisioned in accordance with an exemplary embodiment of the predictive discontinuous reception bypass service, as described herein.

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), virtual, logical, network slice, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the predictive discontinuous reception bypass service may use at least one of these planes of communication. Additionally, an interface of a network device and/or end device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device and/or end device may be provided in order to support the communication (e.g., transmission and reception of messages, an information element (IE), an attribute value pair (AVP), an object, a parameter, or another form of a data instance) between devices and predictive discontinuous reception bypass service logic of the device. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network 120 including, for example, an evolved packet core (EPC) network and/or a 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), interface splitting (e.g., F1-U, F1-C, F2-C, F2-U, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a remote radio unit (RRU), a centralized unit (CU), a CU control plane (CU-CP), a CU user plane (CU-UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), or the like), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Access device 107 may also include other types of network devices, such as a radio network controller (RNC), a RAN Intelligent Controller (RIC), an orchestrator device, an artificial intelligence (AI) and/or machine learning (ML) device, or another type of RAN management or control level network device.

According to an exemplary embodiment, some of access devices 107 include logic that provides the predictive discontinuous reception bypass service. For example, the logic of access device 107 may facilitate setup of RAN resources and provide a non-DRX network slice that supports a data flow in the uplink or the downlink. According to an exemplary embodiment, the predictive discontinuous reception bypass service may be invoked by end device 130 for an uplink data flow and by MEC network 115 for a downlink data flow.

According to an exemplary embodiment, for the uplink, the logic of access device 107 may receive from end device 130 a scheduling request (SR) for uplink RAN resources. The scheduling request may include a request for a DRX bypass (e.g., immediate grant) from access device 107 to establish a radio channel/network slice. Additionally, or alternatively, the request may include a QoS Flow Identifier (QFI) value, which indicates a QoS flow, and/or may include a network slice name or identifier, which indicates a network slice, for example. For example, the QFI value may correlate to a DRX-free radio connection with end device 130. The QoS flow and/or the network slice may be indicative of a DRX bypass associated with the predictive discontinuous reception bypass service. The logic of access device 107 may generate and transmit an uplink grant responsive to the scheduling request. For example, access device 107 may receive a Physical Uplink Control Channel (PUCCH) SR from end device 130 and transmit a Physical Downlink Control Channel (PDCCH) grant to end device 130. The radio channel/network slice may afford a high priority and ultra-low latency metric, for example.

According to an exemplary embodiment, for the downlink, the logic of access device 107 may receive a request from MEC network 115 or MEC device 117. The request may be implemented as an application programming interface (API) call, for example. The request may include a QFI value and/or a network slice name or identifier indicative of a DRX bypass associated with the predictive discontinuous reception bypass service. The request may include other data, such as an end device and/or a user identifier (e.g., a Subscriber Permanent Identifier (SUPI), a Radio Network Temporary Identifier (RNTI), a Permanent Equipment Identifier (PEI), or the like) relating to the prospective downlink data. The logic of access device 107 may, responsive to the request, setup a DRX bypass channel/network slice with end device 130. According to an exemplary embodiment, as previously mentioned for the downlink setup, access device 107 may transmit a control plane message to end device 130. The control plane message may include data to initiate the setup a DRX-free network slice and enable end device 130 to receive prospective downlink data via a radio communication link with access device 107.

According to an exemplary embodiment, the control plane message may be implemented as a Zadoff-Chu signal. The signal may include the QFI value and/or a network slice name or identifier indicative of a DRX bypass associated with the predictive discontinuous reception bypass service. The signal may include an identifier of end device 130 (e.g., IMEI or the like). When received by end device 130, the signal may also cause end device 130 to turn on its transceiver even when end device 130 may be in an idle mode DRX based on logic that provides the predictive discontinuous reception bypass service at end device 130, as described herein.

MEC network 115 may include one or multiple networks of one or multiple types and technologies that provide application services. MEC network 115 may be implemented using one or multiple technologies including, for example, network function virtualization (NFV), software defined networking (SDN), cloud computing, Infrastructure-as-a-Service (IaaS), Platform-as-a-Service (PaaS), Software-as-a-Service (SaaS), or another type of network technology. According to various exemplary embodiments, MEC network 115 may reside at various locations, such as far edge, mid-edge, near edge, or the like, which may be relative to access network 105, core network 120, access device 107, and/or core device 122, associated with a co-location thereof, and/or another configuration/architecture.

Depending on the implementation, MEC network 115 may include various network devices such as MEC devices 117. For example, MEC devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices 130 (not illustrated). MEC devices 117 may include non-virtual, logical, and/or physical network devices.

Additionally, depending on the implementation, MEC devices 117 may include other types of network devices, such as an orchestrator (e.g., a network function virtualization orchestrator (NFVO), a mobile edge (ME) orchestrator, etc.), a virtualized infrastructure manager (VIM), a virtual network function manager (VNFM), an ME platform manager, an operations support system (OSS), a local domain name system (DNS), registries, a traffic rules controller, an ME platform, and/or other types of network devices (e.g., routers, core devices 122, an ingress device, a load balancer, etc.), MEC devices 117 that may pertain to various network-related functions (e.g., security, management, charging, billing, authentication, authorization, policy enforcement, development, etc.), and network resources (e.g., storage devices, communication links, etc.).

MEC devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of application services.

According to an exemplary embodiment, at some of MEC devices 117 include logic that provides the predictive discontinuous reception bypass service. According to an exemplary embodiment, MEC device 117 that hosts an application service may include logic of the predictive discontinuous reception bypass service. For example, a computer vision application of a host server may include logic that includes the predictive discontinuous reception bypass service. According to another exemplary embodiment, MEC device 117 may be implemented as an artificial intelligence (AI) or machine learning (ML) device.

According to an exemplary embodiment, the logic of the predictive discontinuous reception bypass service may provide a predictive scheduling service. The predictive scheduling service may synchronize a setting up of a DRX-free downlink with a completion of an application service and associated prospective transmission of downlink data. For example, the computer vision application may determine the period of time to perform a computer vision process for data and the period of time to establish the DRX-free downlink with access device 107. Based on these time periods, the logic of MEC device 117 may transmit an API call to access device 107 such that the DRX-free downlink will be available upon completion of the computer vision process. For example, according to an exemplary scenario, assume that a setup time for the DRX-free downlink connection may be about 200 microseconds or some other time period, the logic of MEC device 117 may initiate the setup of the DRX-free packet data unit (PDU) connection about 200 microseconds before or some other time period before completing the computer vision process.

According to another exemplary embodiment, the predictive scheduling service may be implemented by an AI or ML device. For example, the AI or ML device may, on behalf of one or multiple application services or host servers, learn when to transmit the API call to access device 107. By way of further example, the AI or ML device may learn and generate an application service profile of an application service that may include a time period of an application service process and a time period to establish/setup a DRX-free downlink network slice to access device 107. The AI or ML device may transmit the API call to access device 107. According to an exemplary embodiment, the API call may include the QFI value and/or the network slice name, as described herein.

Core network 120 may include one or multiple networks of one or multiple network types and technologies. Core network 120 may include a complementary network of access network 105. For example, core network 120 may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a service capability exposure function (SCEF), a lifecycle management (LCM) device, an application function (AF), a mobility management entity (MME), a packet gateway (PGW), an enhanced packet data gateway (ePDG), a serving gateway (SGW), an application function (AF), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), a charging system (CS), and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End device 130 includes a device that may have wireless communication capabilities and optionally other communication capabilities (e.g., wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device, a computer, a gaming device, an IoT device, a drone, customer premise equipment (CPE), or another type of wireless end device. End device 130 may be configured to execute various types of software (e.g., applications, programs, etc.). The number and the types of software may vary among end devices 130. End devices 130 may include "edge-aware" and/or "edge-unaware" application service clients. For purposes of description, end device 130 is not considered a network device.

End device 130 may support one or multiple RATs (e.g., 4G, 5G, future generation, etc.) and various portions of the radio spectrum (e.g., multiple RF bands, multiple carrier frequencies, licensed, unlicensed, mm wave, above mm wave, cm wave, etc.), various levels and genres of network slicing, DC service, CA service, and/or other types of connectivity services.

According to an exemplary embodiment, end device 130 includes logic that provides the predictive discontinuous reception bypass service. For example, for the uplink, the logic of the predictive discontinuous reception bypass service may generate a scheduling request, such as a PUCCH SR, as described herein, for a DRX-free/immediate grant from access device 107. The request may include a QFI value and/or a network slice name, as described herein. Access device 107 may provide an immediate uplink grant, responsive to the request, and end device 130 may transmit the uplink data. Additionally, for example, for the downlink, the logic of the predictive discontinuous reception bypass service of end device 130 may receive the ZC sequenced signal or another type of pilot signal from access device 107 via a receiver of end device 130. According to some exemplary embodiments, the receiver may be a separate and/or dedicated receiver (e.g., relative to a 5G RF transceiver that manages control plane/user plane data) that passively monitors the pilot/ZC sequenced signal will in DRX mode. By way of further example, a ZC or another type of pilot receiver may always be in an "on" state and not subject to the DRX mechanism—unlike a 5G RF transceiver of end device 130 that may be subject to the DRX mechanism in a 5G radio system, for example. According to another exemplary embodiment, a separate and/or dedicated receiver may not be used. For example, while in the DRX mode, the 5G RF transceiver may passively monitor a narrow frequency band/radio spectrum for the pilot or ZC sequenced signal and still substantially retain battery power, prevent overheating, and other advantages associated with the DRX mechanism, as discussed herein. According to some exemplary scenarios, the logic of the predictive discontinuous reception bypass service of end device 130 may cause the 5G RF transceiver to wake up from the DRX mode. End device 130 may receive the downlink data from MEC network 115 via access device 107 based on the ZC sequenced signal or another type of pilot signal that provides a flow control between access device 107 and end device 130 and is associated with the predictive discontinuous reception bypass service.

Figure 2A:
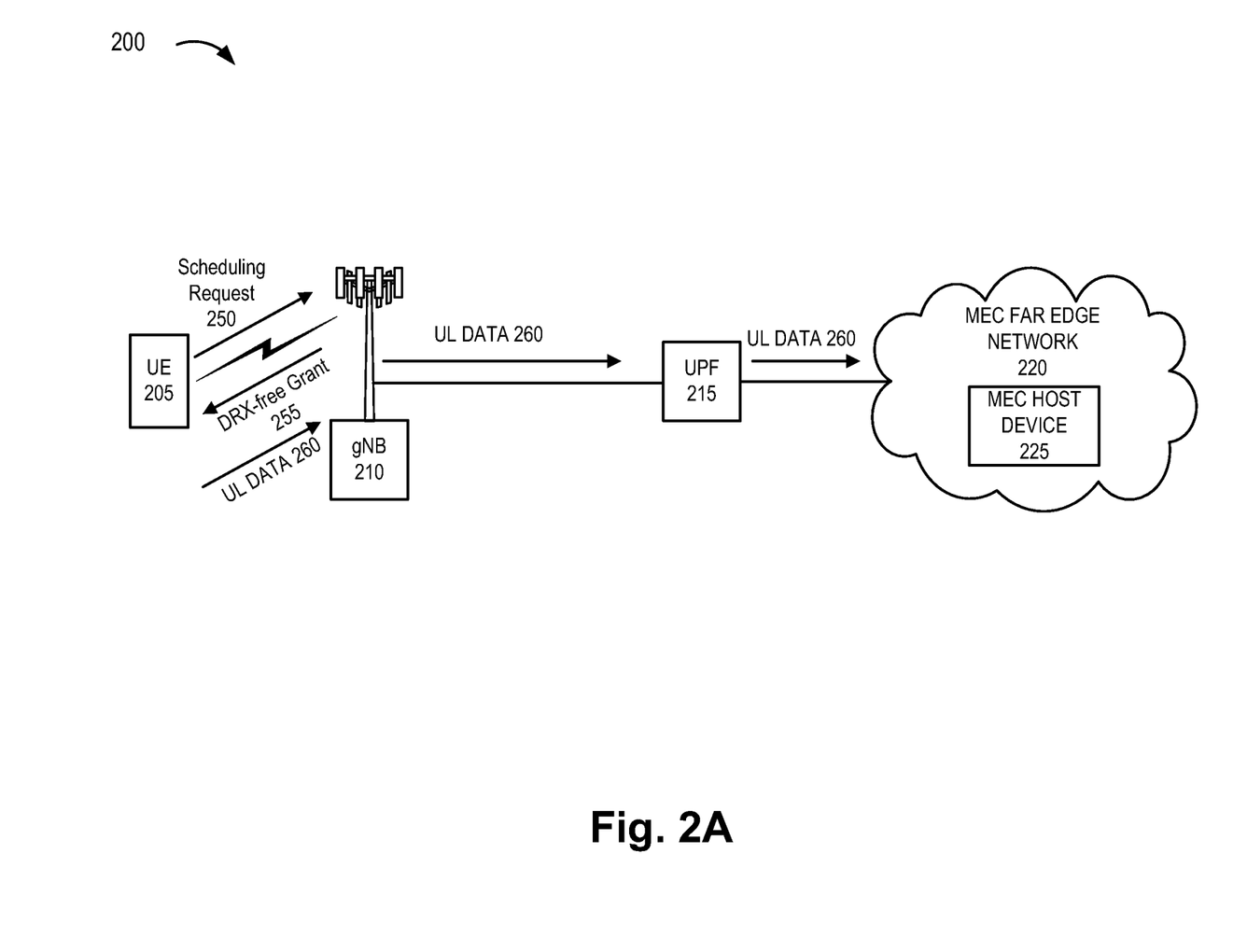
FIG. 2A is a diagram illustrating another exemplary environment in which an exemplary embodiment of a process of the predictive discontinuous reception bypass service may be implemented.

FIG. 2A is a diagram illustrating an exemplary environment 200 in which an exemplary embodiment of an exemplary process of the predictive discontinuous reception bypass service may be implemented. As illustrated, environment 200 may include a UE 205 (e.g., end device 130), a gNB 210 (e.g., access device 107), a UPF 215 (e.g., core device 122), a MEC far edge network 220 (e.g., MEC network 115), and a MEC host device 225 (e.g., MEC device 117). Similar to that described in relation to FIG. 1 and environment 100, the number, type, and arrangement of networks and network devices illustrated in environment 200 are exemplary. Additionally, the number, type, and arrangement of communication links illustrated in environment 200 are exemplary. A communicative connection via a communication link may be direct or indirect.

Referring to FIG. 2A, according to an exemplary uplink scenario and exemplary process of the predictive discontinuous reception bypass service, UE 205 may detect that data has to be uploaded to MEC far edge network 220 for processing and that a DRX-free or a non-DRX radio connection is to be established with gNB 210. According to various exemplary embodiments, the detection and determination may be performed by the end device application service, by the logic of the predictive discontinuous reception bypass service, or both (e.g., based on inter-process communication (IPC) between the bypass service logic and the end device application service). In response to the detection and determination, UE 205 may generate and transmit a scheduling request 250 to gNB 210. Scheduling request 250 may include a QFI value indicative of the DRX-free radio connection and immediate grant by gNB 210. Scheduling request 250 may include other data, as described herein. In response to receiving scheduling request 250, gNB 210 may read scheduling request 250 and generate and transmit a DRX-free grant 255 to UE 205 without regard to the DRX cycle of UE 205. In response to receiving DRX-free grant 255, UE 205 may transmit uplink data 260 to gNB 210, which is forwarded to MEC host device 225 of MEC far edge network 220 via UPF 215 and a network slice, for example, which affords an ultra-low latency QoS flow relating to the QFI value. MEC host device 225 may process uplink data 260.

FIG. 2A is a diagram illustrating an exemplary environment in which an exemplary process of the predictive discontinuous reception bypass service may be implemented. According to other exemplary embodiments, the exemplary environment may be different and/or the exemplary process may include additional, different, or fewer operations than those illustrated and described in relation to FIG. 2A.

Figure 2B:
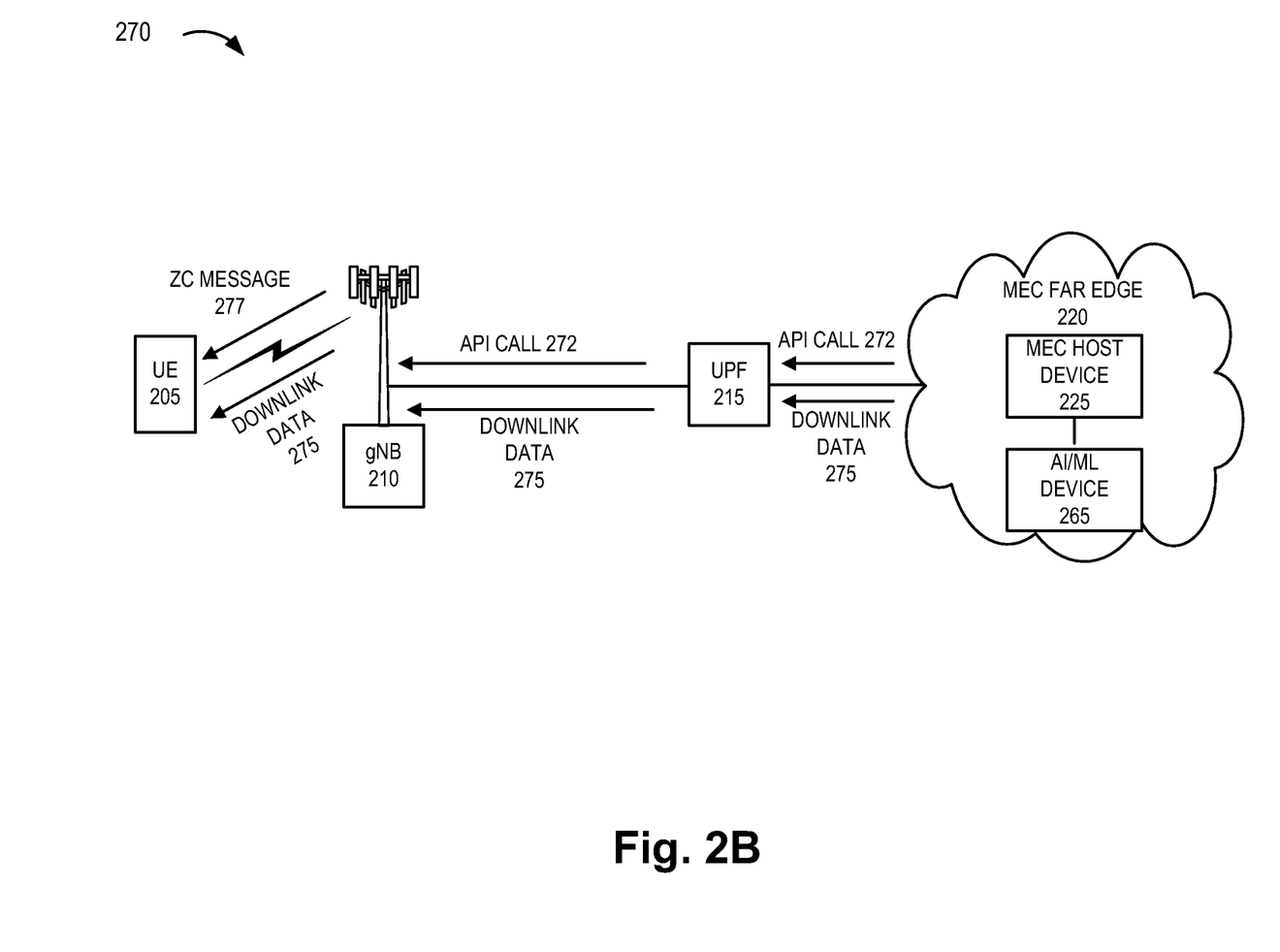
FIG. 2B is a diagram illustrating another exemplary environment in which an exemplary embodiment of a process of the predictive discontinuous reception bypass service may be implemented.

FIG. 2B is a diagram illustrating an exemplary environment 270 in which an exemplary embodiment of an exemplary process of the predictive discontinuous reception bypass service may be implemented. As illustrated, environment 270 may include a similar configuration as that previously described in relation to FIG. 2A, but may also include an AI/ML device 265. AI/ML device 265 may provide a predictive scheduling service of the predictive discontinuous reception bypass service, as described herein. Similar to that described in relation to FIG. 1 and environment 100, the number, type, and arrangement of networks and network devices illustrated in environment 270 are exemplary. For example, according to other exemplary embodiments, AI/ML device 265 may be omitted from environment 270. Additionally, the number, type, and arrangement of communication links illustrated in environment 270 are exemplary. A communicative connection via a communication link may be direct or indirect.

According to some exemplary embodiments, the downlink process of FIG. 2B may be a continuation of the uplink process described in FIG. 2A and elsewhere in this description. According to other exemplary embodiments, the downlink process of FIG. 2B may be independent from the uplink process described in FIG. 2A and elsewhere in this description.

Referring to FIG. 2B, according to an exemplary downlink scenario and exemplary process of the predictive discontinuous reception bypass service, MEC host device 225 may be about to initiate the processing of data or already processing data that is subject to the predictive discontinuous reception bypass service. For example, the mapping of the data to the bypass service may be based on a source device of the data, a prospective destination device for the data, an application service associated with the data, a QFI value relating to the data, metadata or context information relating to the data, historical and/or learned communication interactions associated with MEC host device 225, and/or another configurable determinative criterion.

As illustrated, based on the determination that the data is subject to the predictive discontinuous reception bypass service, an API call 272 may be generated and transmitted to gNB 210. According to some exemplary embodiments, AI/ML device 265 may perform this task. According to other exemplary embodiments, MEC host device 225 may perform this task. For example, an application service residing on MEC host device 225 may include this logic. In either case, as previously described, the transmission of the API call 272 may be synchronized according to the predictive scheduling service. For example, the time period to setup a DRX-free network slice channel and a prospective time period for the data to be processed. The time period to setup the DRX-free network slice channel may be configured as a constant value or determined based on known techniques, such as pinging, or analytical analysis of current and/or prospective network states (e.g., load, congestion, etc.) relating to communication links, network devices, and so forth. API call 272 may include a QFI value indicative of the predictive discontinuous reception bypass service. The QFI value may be used by UPF 215 and gNB 210, for example, as an indicator for setup and establishment of a DRX-free network slice, channel, and/or QoS flow.

Upon completion of the data processing, MEC host device 225 may transmit downlink data 275 to gNB 210 via UPF 215 in which the DRX-free network slice/channel has been setup according to the predictive scheduling service. Based on receipt of downlink data 275, according to some exemplary embodiments, gNB 210 may determine whether UE 205 is in DRX mode (e.g., sleep mode with RF module turned off). When gNB 210 determines that UE 205 is in the DRX mode, as illustrated, gNB 210 may generate and transmit a message, such as a ZC message 277 to UE 205. ZC message 277 may include the QFI value. ZC message 277 may include other data (e.g., end device identifier, etc.), as described herein. In response to receiving the message (e.g., ZC message 277), UE 205 may wake up, and gNB 210 may transmit downlink data 275 to UE 205. According to other exemplary embodiments, when gNB 210 determines that UE 205 is not in the DRX mode, gNB 210 may transmit downlink data 275 without previously transmitting a message (e.g., ZC message 277). Still according to yet another embodiment, gNB 210 may transmit a message (e.g., ZC message 277) before transmitting downlink data 275 regardless of the UE's 205 current DRX state or mode.

FIG. 2B is a diagram illustrating an exemplary environment in which an exemplary process of the predictive discontinuous reception bypass service may be implemented. According to other exemplary embodiments, the exemplary environment may be different and/or the exemplary process may include additional, different, or fewer operations than those illustrated and described in relation to FIG. 2B.

Figure 3:
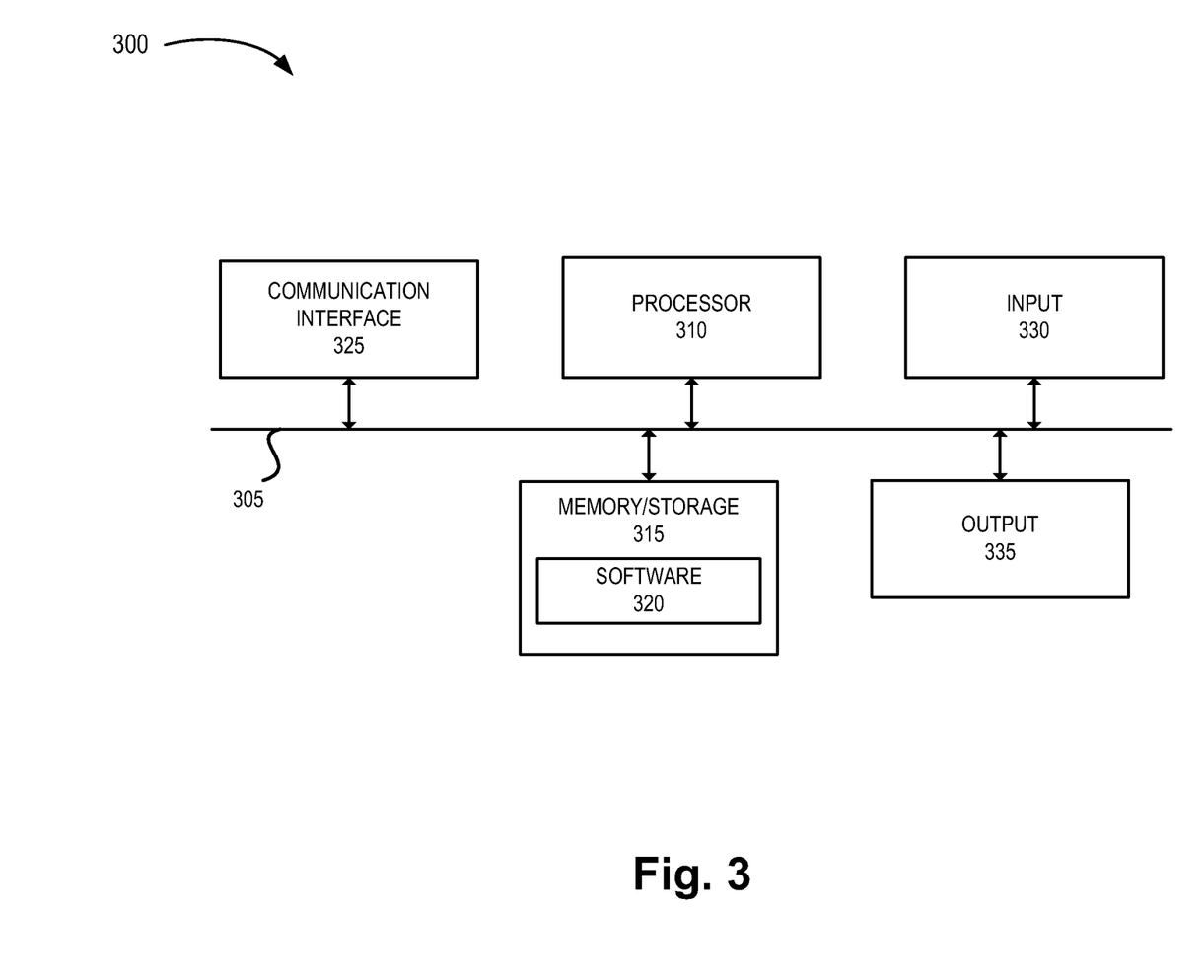
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, MEC device 117, core device 122, end device 130, UE 205, gNB 210, UPF 215, MEC host device 225, AI/ML device 265, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to end device 130, software 320 may include an application that, when executed by processor 310, provides a function and/or a process of predictive discontinuous reception bypass service, as described herein. Additionally, with reference to access device 107 and/or MEC device 117, software 320 may include an application that, when executed by processor 310, provides a function and/or a process of predictive discontinuous reception bypass service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, access device 107, core device 122, MEC device 117, and/or another type of network device or end device 130, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
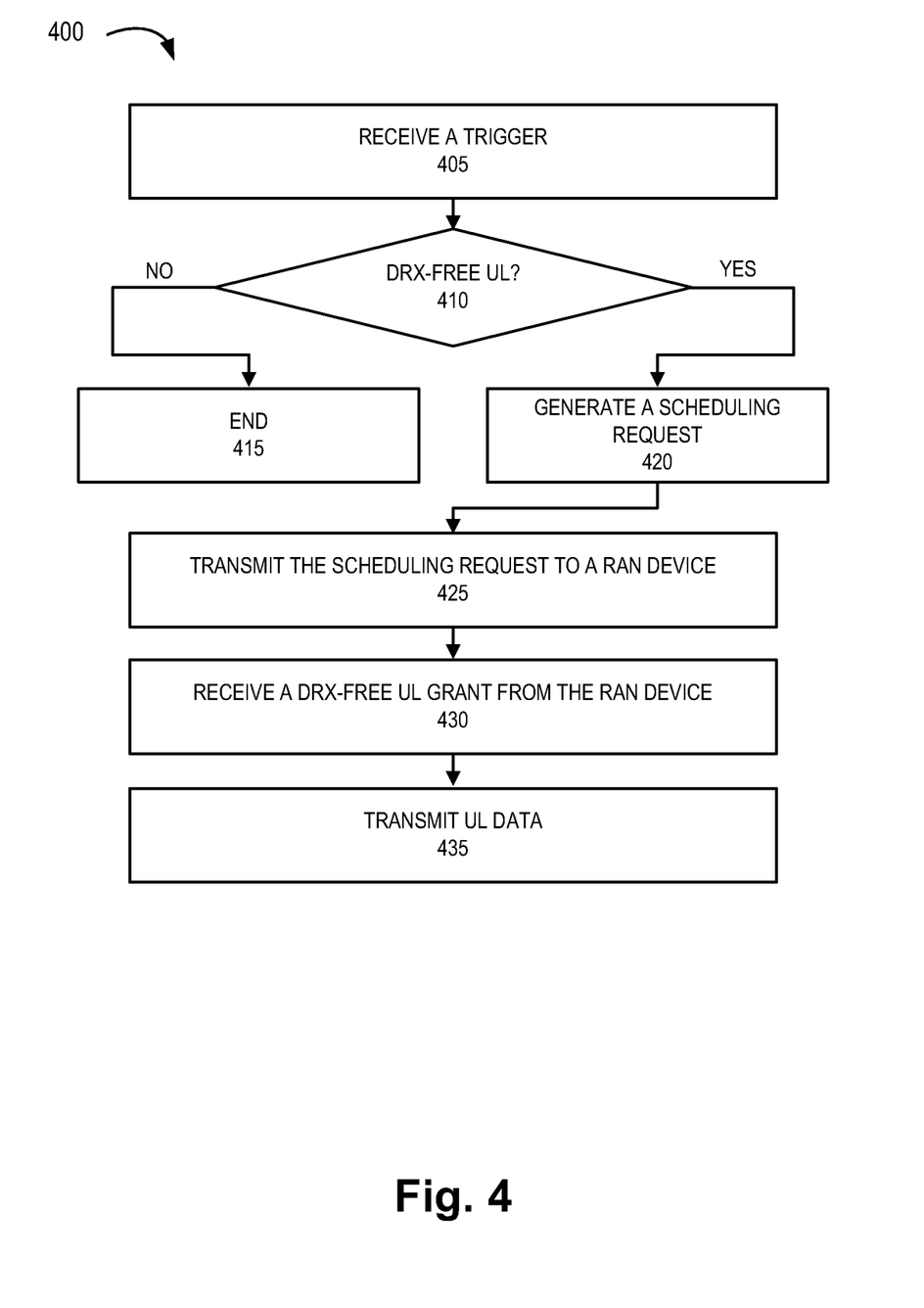
FIG. 4 is a flow diagram illustrating an exemplary process of an exemplary embodiment of the predictive discontinuous reception bypass service.

FIG. 4 is a flow diagram illustrating an exemplary process 400 of an exemplary embodiment of the predictive discontinuous reception bypass service. According to an exemplary embodiment, end device 130 may perform a step of process 400. According to an exemplary implementation, processor 310 executes software 320 to perform the step of process 400, as described herein.

In block 405, end device 130 may receive a trigger. For example, the execution of an application service on end device 130 may be initiated. In block 410, end device 130 may determine whether a DRX-free uplink is needed. For example, the application service, bypass service logic at end device 130, or a combination of the application service and bypass service logic may make this determination, as described herein. When it is determined that the DRX-free uplink is not needed (block 410-NO), process 400 may end (block 415). For example, the application service may execute. When it is determined that the DRX-free uplink is needed (block 410-YES), end device 130 may generate a scheduling request (block 420). For example, end device 130 may determine that uplink data is to be transmitted to MEC network 115 in which the DRX bypass service is needed. The scheduling request may include a QFI value, as described herein. In block 425, end device 130 may transmit the scheduling request to a radio access network device. In block 430, end device 130 may receive a DRX-free uplink grant from the radio access network device. In block 435, end device 130 may transmit uplink data.

FIG. 4 illustrates an exemplary embodiment of a process of the predictive discontinuous reception bypass service, according to other exemplary embodiments, the predictive discontinuous reception bypass service may perform additional operations, fewer operations, and/or different operations than those illustrated and described.

Figure 5:
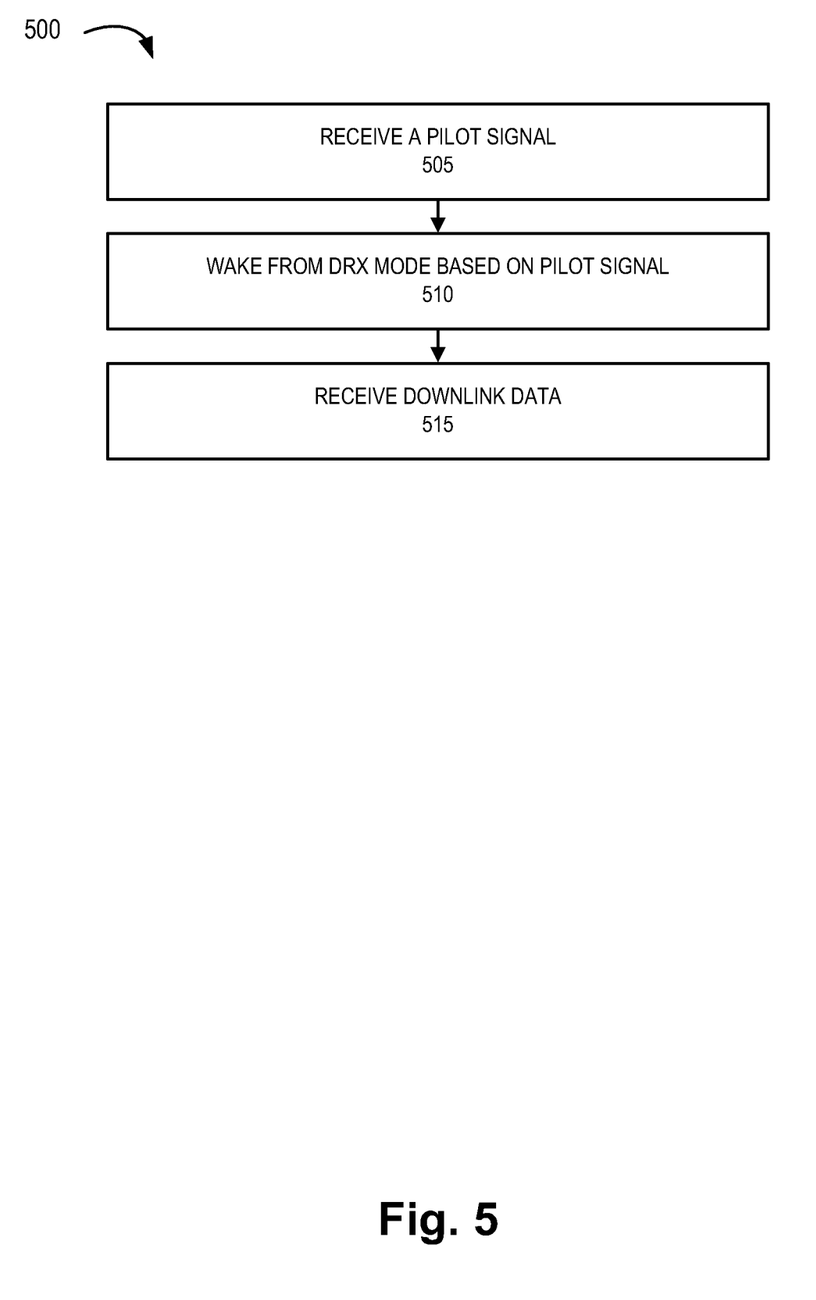
FIG. 5 is a flow diagram illustrating another exemplary process of an exemplary embodiment of the predictive discontinuous reception bypass service.

FIG. 5 is a flow diagram illustrating an exemplary process 500 of an exemplary embodiment of the predictive discontinuous reception bypass service. According to an exemplary embodiment, end device 130 may perform a step of process 500. According to an exemplary implementation, processor 310 executes software 320 to perform the step of process 500, as described herein.

In block 505, end device 130 may receive a pilot signal from access device 107. For example, the pilot signal may be implemented as a ZC sequenced signal, a CAZAC sequenced signal, of another type of modulated signal with trellis/convolution code that includes a QFI value. In block 510, end device 130 may wake from the DRX mode in response to the pilot signal. For example, end device 130 may turn on an RF transceiver or receiver in response to the reading of the ZC sequenced signal. In block 515, end device 130 may receive downlink data from access device 107.

FIG. 5 illustrates an exemplary embodiment of a process of the predictive discontinuous reception bypass service, according to other exemplary embodiments, the predictive discontinuous reception bypass service may perform additional operations, fewer operations, and/or different operations than those illustrated and described.

Figure 6:
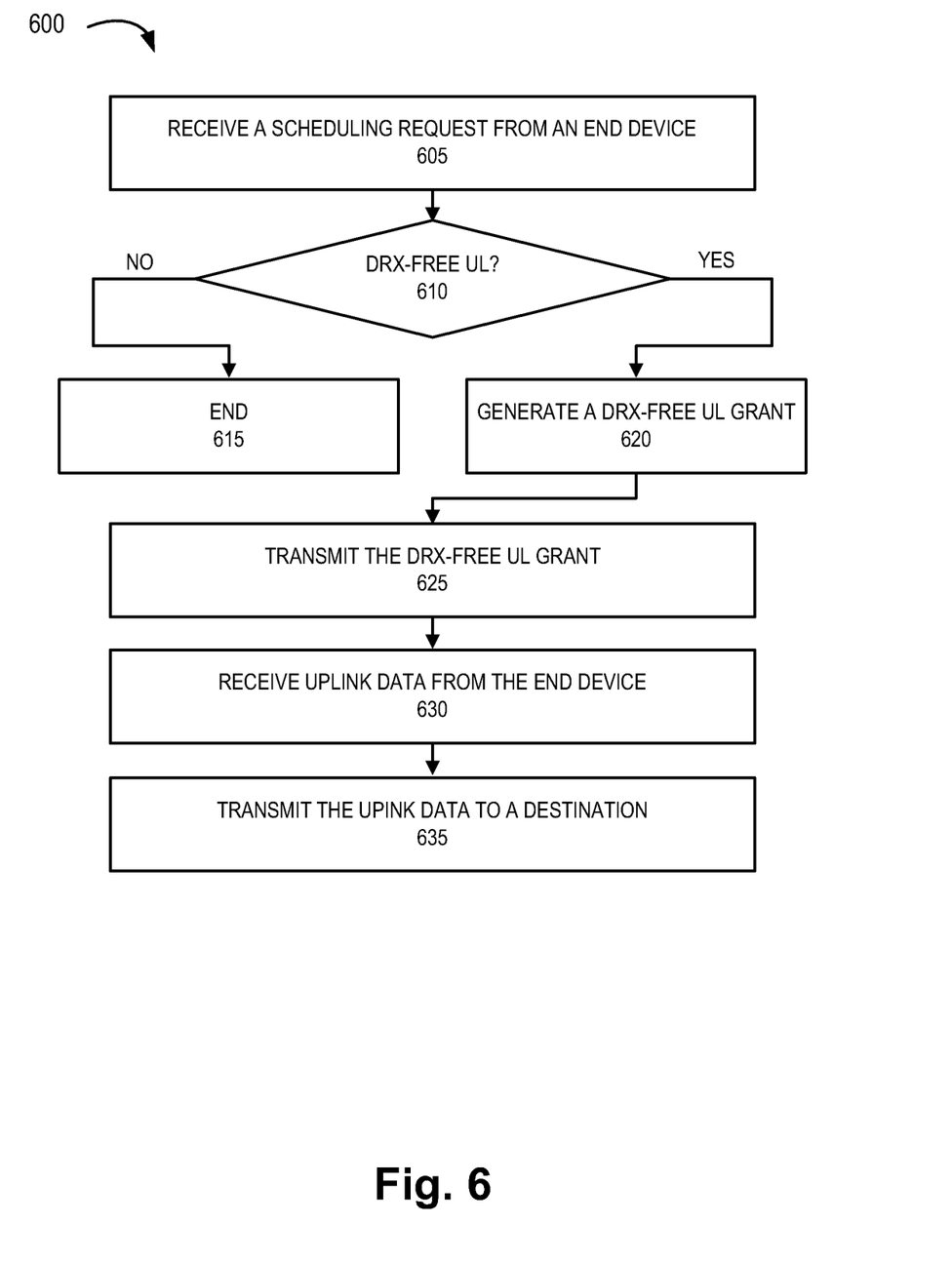
FIG. 6 is a flow diagram illustrating still another exemplary process of an exemplary embodiment of the predictive discontinuous reception bypass service.

FIG. 6 is a flow diagram illustrating an exemplary process 600 of an exemplary embodiment of the predictive discontinuous reception bypass service. According to an exemplary embodiment, access device 107 may perform a step of process 600. According to an exemplary implementation, processor 310 executes software 320 to perform the step of process 600, as described herein.

In block 605, access device 107 may receive a scheduling request from end device 130. In block 610, access device 107 may determine whether the schedule request relates to a DRX-free uplink. For example, access device 107 may read the schedule request and determine whether a QFI value associated with the DRX bypass service is present or not.

When it is determined that the scheduling request does not relate to the DRX-free uplink (block 610-NO), process 600 may end (block 615). For example, access device 107 may perform an uplink grant procedure that does not include a DRX-free uplink grant, as described herein. When it is determined that the scheduling request does relate to the DRX-free uplink (block 610-YES), access device 107 may generate a DRX-free uplink grant (block 620). In block 625, access device 107 may transmit the DRX-free uplink grant to end device 130. In block 630, access device 107 may receive uplink data from end device 130. In block 635, access device 107 may transmit the uplink data to a destination. For example, access device 107 may transmit the uplink data to or towards MEC network 115.

FIG. 6 illustrates an exemplary embodiment of a process of the predictive discontinuous reception bypass service, according to other exemplary embodiments, the predictive discontinuous reception bypass service may perform additional operations, fewer operations, and/or different operations than those illustrated and described.

Figure 7:
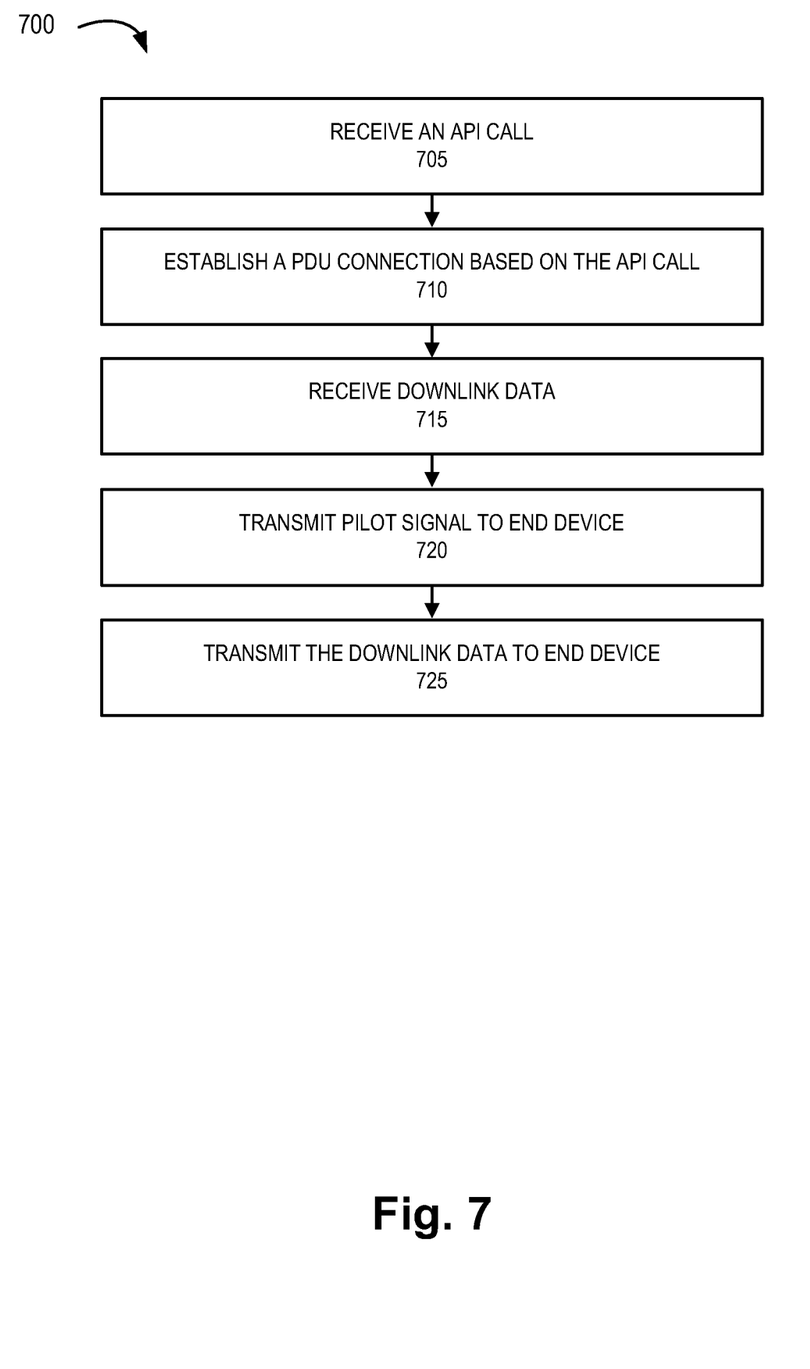
FIG. 7 is a flow diagram illustrating yet another exemplary process of an exemplary embodiment of the predictive discontinuous reception bypass service.

FIG. 7 is a flow diagram illustrating an exemplary process 700 of an exemplary embodiment of the predictive discontinuous reception bypass service. According to an exemplary embodiment, access device 107 may perform a step of process 700. According to an exemplary implementation, processor 310 executes software 320 to perform the step of process 700, as described herein.

In block 705, access device 107 may receive an API call. For example, the API call may invoke the DRX bypass service based on the QFI value included in the API call.

In block 710, access device 107 may establish a PDU connection based on the API call. For example, access device 107 may establish a network slice that will support a prospective QoS flow relating to the DRX bypass service with uplink network devices. For example, in a split RAN architecture, an RU may establish a data radio bearer of the network slice, or a gNB may establish the PDU connection/network slice with core device 122, such as a UPF.

In block 715, access device 107 may receive downlink data. For example, the downlink data may be received from MEC network 115 via core device 122 and the established PDU connection. In block 720, access device 107 may transmit a pilot signal to end device 130. For example, access device 107 may transmit a ZC sequenced signal or another type of signal (e.g., CAZAC, etc.) as described herein, which includes the QFI value, to end device 130. In block 725, access device 107 may transmit the downlink data to end device 130.

FIG. 7 illustrates an exemplary embodiment of a process of the predictive discontinuous reception bypass service, according to other exemplary embodiments, the predictive discontinuous reception bypass service may perform additional operations, fewer operations, and/or different operations than those illustrated and described.

Figure 8:
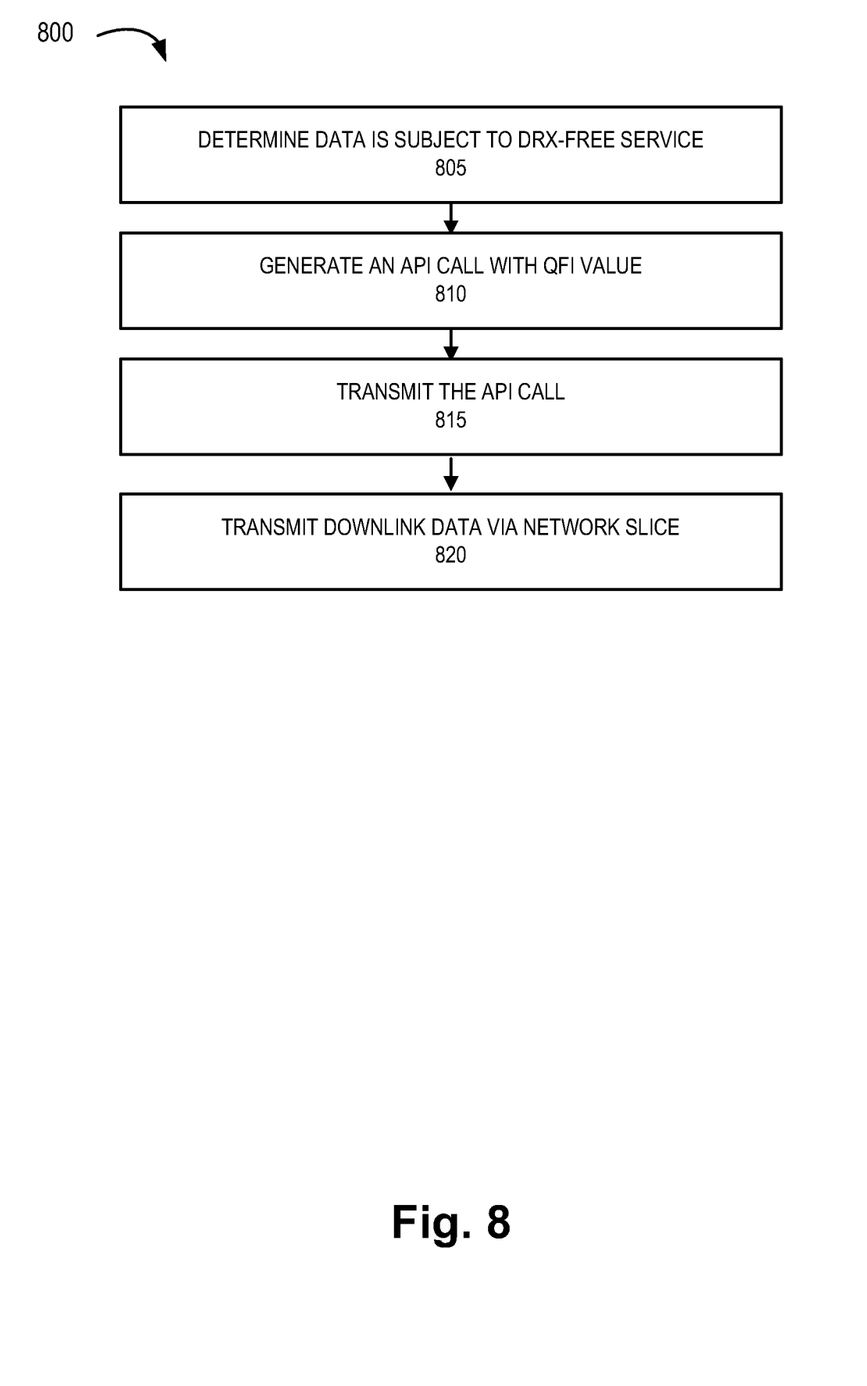
FIG. 8 is a flow diagram illustrating another exemplary process of an exemplary embodiment of the predictive discontinuous reception bypass service.

FIG. 8 is a flow diagram illustrating an exemplary process 800 of an exemplary embodiment of the predictive discontinuous reception bypass service. According to an exemplary embodiment, MEC device 117 may perform a step of process 800. According to an exemplary implementation, processor 310 executes software 320 to perform the step of process 800, as described herein.

In block 805, MEC device 117 may determine that data is subject to DRX-free service. For example, MEC device 117 may identify that the data is to be transmitted in the downlink that is associated with the DRX-free service.

In block 810, MEC device 117 may generate an API call that includes a QFI value. For example, the QFI value may be associated with the DRX bypass service and a network slice/QoS flow. In block 815, MEC device 117 may transmit the API call. For example, MEC device 117 may transmit the API call to access device 107 based on the predictive scheduling procedure, as described herein. In block 820, MEC device 117 may transmit the downlink data. For example, MEC device 117 may transmit the downlink data via a network slice or PDN connection established with access device 107 based on the API call.

FIG. 8 illustrates an exemplary embodiment of a process of the predictive discontinuous reception bypass service, according to other exemplary embodiments, the predictive discontinuous reception bypass service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 4, 5, 6, 7, and 8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device of a radio access network, downlink data;
   generating, by the network device, a pilot signal that includes a quality of service flow identifier (QFI) value, and when received by an end device, causes the end device to wake-up from a discontinuous reception (DRX) mode;
   transmitting, by the network device, the pilot signal to the end device to which the downlink data pertains; and
   transmitting, by the network device, the downlink data to the end device.

2. The method of claim 1, further comprising:
   determining, by the network device, that the end device is in the DRX mode.

3. The method of claim 1, further comprising:
   receiving, by the network device before receiving the downlink data, an application programming interface (API) call, which includes the QFI value, from a multi-access edge computing (MEC) network device; and
   establishing, by the network device based on the API call and prior to receiving the downlink data, a packet data unit (PDU) connection with the MEC network device.

4. The method of claim 1, further comprising:
   receiving, by the network device before receiving the downlink data, an uplink scheduling request that includes the QFI value from the end device; and
   transmitting, by the network device regardless of a current DRX mode of the end device, an uplink grant to the end device.

5. The method of claim 4, further comprising:
   receiving, by the network device based on the uplink grant, uplink data from the end device.

6. The method of claim 1, wherein the pilot signal includes an identifier of the end device.

7. The method of claim 1, wherein the QFI value correlates to a DRX-free radio connection with the end device.

8. The method of claim 1, wherein the network device is a next generation Node B.

9. A network device comprising:
   a processor configured to:
      receive downlink data, wherein the network device is of a radio access network;
      generate a pilot signal that includes a quality of service flow identifier (QFI) value, and when received by an end device, causes the end device to wake-up from a discontinuous reception (DRX) mode;
      transmit the pilot signal to the end device to which the downlink data pertains; and
      transmit the downlink data to the end device.

10. The network device of claim 9, wherein the processor is further configured to:
    determine that the end device is in the DRX mode.

11. The network device of claim 9, wherein the processor is further configured to:
    receive, before receiving the downlink data, an application programming interface (API) call, which includes the QFI value, from a multi-access edge computing (MEC) network device; and
    establish, based on the API call and prior to receiving the downlink data, a packet data unit (PDU) connection with the MEC network device.

12. The network device of claim 9, wherein the processor is further configured to:
    receive, before receiving the downlink data, an uplink scheduling request that includes the QFI value from the end device; and
    transmit, by the network device regardless of a current DRX mode of the end device, an uplink grant to the end device.

13. The network device of claim 12, wherein the processor is further configured to:
    receive, based on the uplink grant, uplink data from the end device.

14. The network device of claim 9, wherein the pilot signal includes an identifier of the end device.

15. The network device of claim 9, wherein the QFI value correlates to a DRX-free radio connection with the end device.

16. The network device of claim 9, wherein the network device is a next generation Node B.

17. A non-transitory computer-readable storage medium storing instructions executable by a processor of a network device of a radio access network, wherein the instructions are configured to:
    receive downlink data;
    generate a pilot signal that includes a quality of service flow identifier (QFI) value, and when received by an end device, causes the end device to wake-up from a discontinuous reception (DRX) mode;
    transmit the pilot signal to the end device to which the downlink data pertains; and
    transmit the downlink data to the end device.

18. The non-transitory computer-readable storage medium of claim 17, wherein the instructions are further configured to:
    determine that the end device is in the DRX mode.

19. The non-transitory computer-readable storage medium of claim 17, wherein the instructions are further configured to:
    receive, before receiving the downlink data, an uplink scheduling request that includes the QFI value from the end device; and
    transmit, by the network device regardless of a current DRX mode of the end device, an uplink grant to the end device.

20. The non-transitory computer-readable storage medium of claim 17, wherein the QFI value correlates to a DRX-free radio connection with the end device.

* * * * *